United States Patent [19]

Hutchin

[11] Patent Number: 4,696,573
[45] Date of Patent: Sep. 29, 1987

[54] DUAL SHEAR WAVEFRONT SENSOR

[75] Inventor: Richard A. Hutchin, Marlboro, Mass.

[73] Assignee: Itek Corporation, Lexington, Mass.

[21] Appl. No.: 751,633

[22] Filed: Jul. 3, 1985

[51] Int. Cl.$^4$ .............................................. G01B 9/02
[52] U.S. Cl. ................................... 356/353; 250/201; 364/525
[58] Field of Search ............... 356/353, 354, 359, 360; 250/201; 364/525, 571

[56] References Cited

U.S. PATENT DOCUMENTS

| | | | |
|---|---|---|---|
| 3,829,219 | 8/1974 | Wyant | 356/353 |
| 3,921,080 | 11/1975 | Hardy | 356/353 X |
| 3,923,400 | 12/1975 | Hardy | 356/353 |
| 4,141,652 | 2/1979 | Feinleib | 250/201 X |
| 4,518,854 | 5/1985 | Hutchin | 356/354 X |

Primary Examiner—Davis L. Willis
Assistant Examiner—Matthew W. Koren
Attorney, Agent, or Firm—Michael H. Wallach; Robert F. Rotella

[57] ABSTRACT

A wavefront of light is focused upon a first shearing interferometer having a relatively large shear and small dynamic range and a relatively minor portion of the light is focused upon a second shearing interferometer having a relatively small shear but large dynamic range. Owing to the limited dynamic range of the first shearing interferometer a plurality of a plurality of virtual candidate measurements are manifest which are compared with the temporally and/or spatially averaged values of each measurement produced by the second shearing interferometer and the closest match is employed to obtain a highly accurate unambiguous reading of the wavefront slope measurements.

16 Claims, 6 Drawing Figures

DUAL SHEAR WAVEFRONT SENSOR

BACKGROUND OF THE INVENTION

The present invention relates to wavefront sensors for measuring phase distortions in a wavefront of light.

The resolution of ground based optical imaging systems is limited by random wavefront tilts and phase changes produced by atmospheric turbulence. The resolution of such optical systems is usually limited to about one or two arc seconds by the atmosphere and may be considerably improved if the atmospheric distortion can be measured and corrected in real-time prior to recording of the image on tape or film.

A system for real-time optical wavefront compensation employing discrete components to perform the wavefront sensing and wavefront compensation functions is disclosed in U.S. Pat. No. 3,923,400, issued to John W. Hardy for A Real-Time Wavefront Correction System, which is incorporated by reference herein. In the approach disclosed in this patent, a wavefront being examined is directed onto an AC lateral shearing interferometer which measures in real time the relative phase differences between different portions of the wavefront. The constructional details of a suitable lateral AC shearing interferometer are disclosed in Wyant U.S. Pat. No. 3,829,219 for Shearing Interferometer incorporated by reference herein. The measured phase differences in the form of a first set of electrical signals are then directed to a data processor which generates a second set of electrical signals, the amplitudes of which are proportional to the required phase corrections at the different areas of the wavefront. The second set of signals may be directed to a separate phase corrector element upon which the wavefront is incident to eliminate the relative phase differences of the wavefront. One type of separate phase corrector element disclosed by this patent is an active mirror having an array of piezoelectric elements incorporated therein which function to selectively deform the mirror surface to eliminate phase distortions in the wavefront. The constructional details of an active piezoelectric mirror of this nature are disclosed in U.S. Pat. No. 3,904,274 for Monolithic Piezoelectric Wavefront Phase Modulator incorporated by reference herein.

At other times the shearing interferometer may be employed in the absense of such compensation to measure phase distortion of the wavefront per se, or distortions of an optical system through which the light is passed.

The Wyant interferometer of the '219 patent, is often employed with a shear equal to one sub-aperture. While the results of the measurements are quite accurate, the dynamic range of the wavefront sensor is only plus or minus one half of a wavelength per sub-aperture. If the shear is reduced for example to one quarter wavelength per sub-aperture, the dynamic range is considerably expanded to typically plus or minus two wavelengths per sub-aperture. However, the resulting set of measurements have far less accuracy, due to the reduced shear, and less spatial resolution. Since a typical phase distortion or tilt in the slope of the wavefront passing through the atmosphere can be plus or minus two wavelengths per sub-aperture or more, it is thus an object of the present invention to provide a method of obtaining with a single interferometer, both a relatively large dynamic range in the measurements, of at least plus or minus two wavelengths per sub-aperture, and yet retain the accuracy of the large shear interferometer having the restricted dynamic range of plus or minus one half of a wavelength per sub-aperture.

SUMMARY OF THE INVENTION

In accordance with a preferred method of the invention, a wavefront of light is focused upon a first shearing interferometer having a relatively large shear and small dynamic range and a relatively minor portion of the light is focused upon a second shearing interferometer having a relatively small shear but large dynamic range. Owing to the limited dynamic range of the first shearing interferometer a plurality of virtual candidate measurements are manifest which are compared with the averaged values of each measurement produced by the second shearing interferometer and the closest match is employed to obtain a highly accurate unambiguous reading of the wavefront slope measurements. Temporal or spatial averaging of the phase measurements of the second interferometer may advantageously be employed.

Other objects, features and advantages of the present invention will become apparent upon study of the following specific description taken in conjunction with the drawings in which.

The invention may also be employed in connection with copending patent application Ser. No. 751,635, filed July 3, 1985 in the name of Richard Hutchin and Alan MacGovern, entitled "Spatial Processing For Single Or Dual Shear Wavefront Sensor" and assigned to the same assignee as the present invention.

SPECIFIC DESCRIPTION

Figure 1:
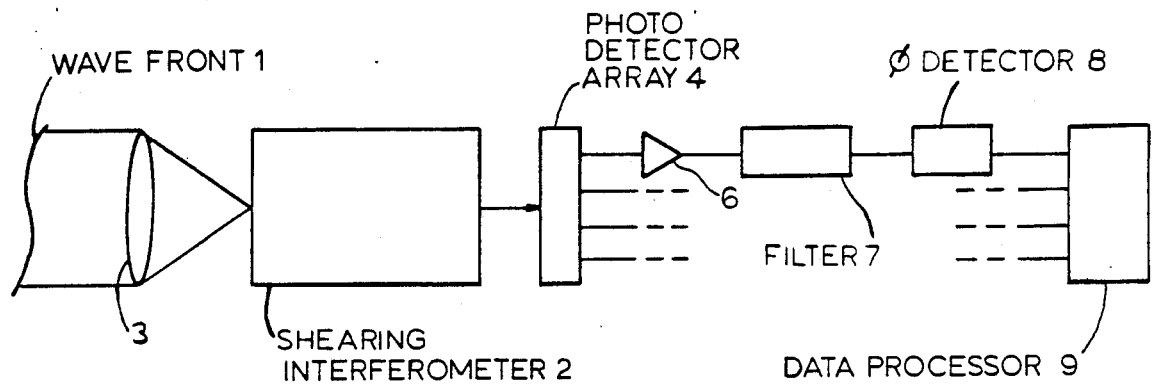
FIG. 1 illustrates a prior art arrangement of the AC shearing interferometer means comprising the interferometer proper and associated electronics.

Referring now to FIG. 1, the wavefront 1 to be measured in accordance with the prior art is directed upon the aforementioned shearing interferometer 2 by an optical device such as a telescope represented by lens 3, for producing a shearing interferogram. First and second diffraction gratings, each of which has a spatial frequency slightly different from the other, are positioned in the wavefront. The first diffraction grating produces a first, n order, diffracted beam. The second diffraction grating produces a second, n order, diffracted beam which is angularly displaced relative to the first, n order, diffracted beam, but that has a region of overlap within which the lateral shearing interferogram is produced. The diffracted beams which form the lateral shearing interferogram are first order diffracted beams. Also, the interferometer is used with the wavefront 1 being converged to a focal point and wherein the first and second diffraction gratings are positioned in proximity to the focal point. The above mentioned shearing interferometer 2 described in detail in U.S. Pat. Nos. 3,829,219 and 3,923,400 produces a shearing interferogram of wavefront 1, and further details may be found therein.

The signal detection system for the shearing interferometer includes photo diode array 4 for converting the interferogram into electrical signals which are fed to processor 9 by a number of channels, each including amplifier 6, filter 7 and phase detector 8. Band pass filter 7 is tuned to the modulation frequency of grating motion, and phase detection circuit 8 compares the resulting signal with the phase of a reference signal to produce an analog output signal proportional to the phase difference value, and applied to data processor 9, which performs the required computation to convert the x and y phase difference values from all channels produced by the shearing interferometer, into the required phase correction values for actuating an active mirror element for compensation purposes. The computation is mathematically a matrix inversion followed by a least squares smoothing. Thus components 6, 7 and 8 are repeated for each channel associated with an individual photo diode in the X-Y photo diode array. The manner of operation of these components is fully described in U.S. Pat. No. 3,923,400 of John W. Hardy. The phase shift difference measurements, produced by the interferometer means including unit 2 and its electronic components 6, 7 and 8, are indicative of the wavefront slopes and are manifested in matrix form, also as disclosed in FIGS. 4 and 5 of this patent. See also the Journal of the Optical Society of America, Vol. 67, No. 3, Mar, 1977, authored by John W. Hardy entitled "Real Time Atmospheric Compensation". In the '400 patent, it is stated in connection with the embodiment described, that the output of each phase detector channel provides unambiguous wavefront difference values up to only plus or minus one half of a wavelength. As mentioned earlier, this produces measurement ambiguity which is resolved in accordance with the present invention.

Figure 2:
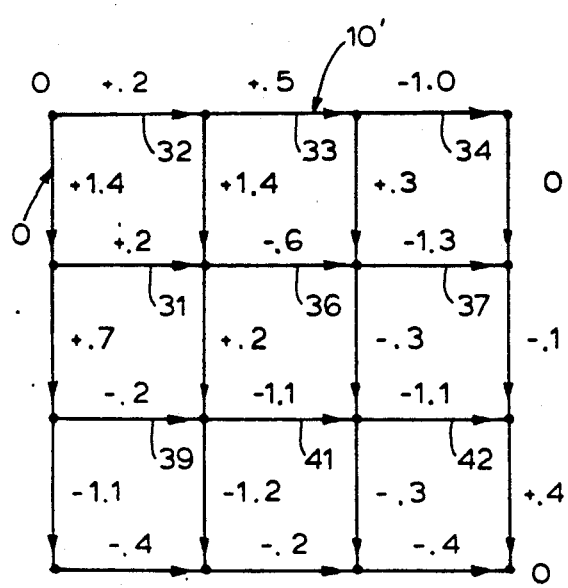
FIGS. 2 and 3 illustrate various prior art matrix configurations of phase difference measurements produced by the interferometer means.
Figure 3:
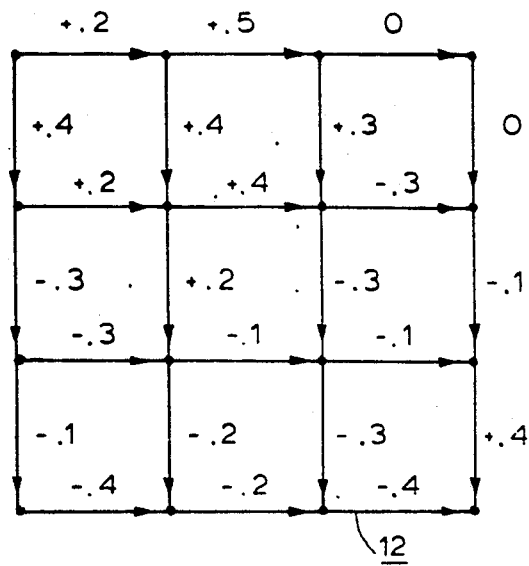

FIG. 2 illustrates a matrix of loops of theoretical phase difference values which, in the absence of the aforesaid ambiguity or optical noise, result in the sums of each loop being equal to zero. FIG. 3 on the other hand illustrates typical actual measurements. The upper lefthand loop 10 of FIG. 2 is summed by adding plus 0.2 to plus 1.4 and subtracting plus 0.2 and thereafter subtracting +1.4 to equal a sum of zero. The subtraction of the latter two measurements is indicated due to the convention of summing clockwise in a direction against the arrowheads. The loop 10' immediately to the right of the upper lefthand loop 10 will also sum to zero as follows: plus 0.5, plus 0.3, minus (−0.6), minus (+1.4). Thus the first three measurements add to 1.4 algebraically and the last measurement of plus 1.4 is subtracted because we are summing against the direction of the arrow in the manner of the convention illustrated in FIG. 5 of the abovesaid '400 patent. All of the loops in FIG. 2 will sum to zero since they are ideal loops of measurements not subject to optical noise, and not subject to the measurement ambiguity. However, actual measurements will often not produce this result, as may be seen for example by the summing of the loops of 11 and 12 in FIG. 3; the algebraic sums thereof are one rather than zero. Specifically, the sum about loop 11 is +0.2, +0.2, −(−0.3)−(−0.3)=+1; the sum about loop 12 is −0.1, +0.4, −(−0.4), −(−0.3)=+1.

Figure 4:
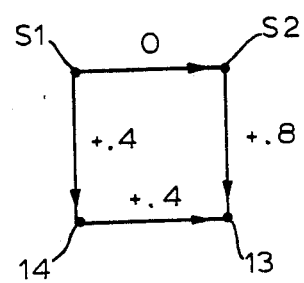
FIGS. 4 and 5 illustrate loops which are helpful in explaining the nature of relative phase shifts of points on a wavefront.

FIG. 4 illustrates a loop having the relative phase shift difference values produced by the interferometer as indicated, the loop corresponding to a sub-aperture of the wavefront under examination.

Assume that the phase shift difference value measured by the interferometer between S-1 and S-2 is zero; thus there is no change in the slope of the wavefront. However, the wavefront ascends out of the plane of the paper by 0.8 wavelengths, and descends in our example toward S-1 as we proceed about the loop between 13 and 14, and 14 and S-1. This is analogous to an airplane taking off from an airfield built at an elevated altitude. If one was to measure altitude changes of the airplane as it flies about, the sum will equal zero when the airplane again lands at the same landing place. Thus in our example as we proceed clockwise about the loop of FIG. 4, we will sum to zero: plus 0.8, minus 0.4, minus 0.4, which will equal zero. The descent from point 13 out of the plane of the paper, back toward the plane of the paper is represented by the negative signs manifest by the arrowheads employed conventionally as indicated.

Figure 5:
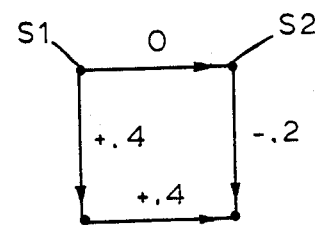
Figure 6:
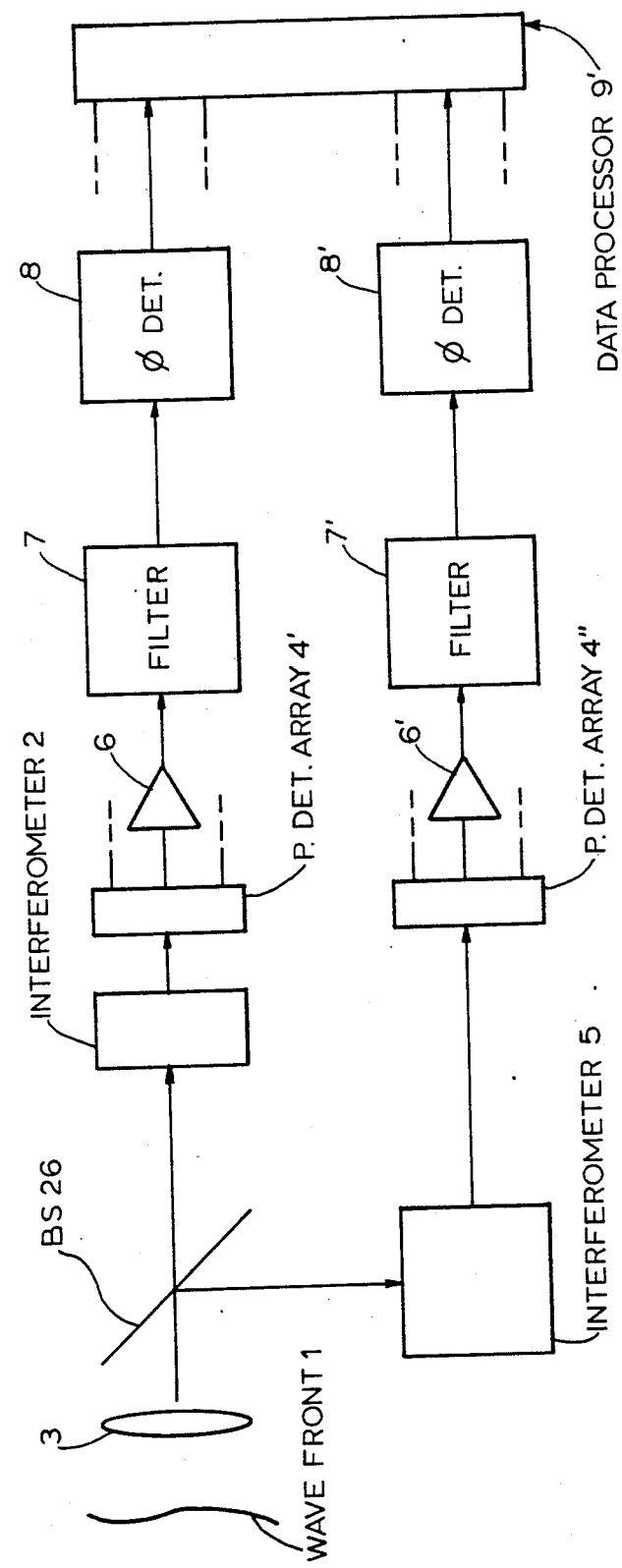
FIG. 6 illustrates an embodiment of the present invention.

FIG. 5 however, illustrates an altered measurement of plus 0.8 which becomes minus 0.2 owing to the abovementioned interferometer measurement ambiguity. Since the dynamic range in our example is plus or minus one half wavelength (0.5), the 0.8 actual phase difference will be measured as a minus 0.2 as indicated in FIG. 5. The resulting sum of the actual measurement would therefore be zero, minus 0.2, minus 0.4, minus 0.4, which equals minus one rather than zero. The latter two measurements are both −0.4 since we are proceeding against the direction of the arrowhead; −(+0.4)=−0.4. Referring now to FIG. 6, wavefront 1 is focused by a telescope or other optical device schematically represented by lens 3 upon shearing interferometer 2 as previously described. The output of the first shearing interferometer is applied to data processor 9' by components 6, 7, and 8 for each channel in the x-y matrix, also as previously described. Shearing interferometer 2 has a relatively large shear e.g. a shear of one wavelength per sub-aperture, but has a relatively small dynamic range of typically, plus or minus one half wavelength per sub-aperture. Beamsplitter 26 is positioned between optical element 3 and shearing interferometer 2, and causes most of the light (typically over 80%) to be directed at the first large shear interferometer 2. A second, small shear interferometer 5 having a shear of e.g. one fourth of a wavelength per sub-aperture, but having a relatively large dynamic range of typically plus or minus two wavelengths, is positioned to receive the remaining light directed thereat by beamsplitter 26. The first shearing interferometer 2 provides a first set of phase difference measurements having values indicative of the slope of the wavefront 1, preferably arranged in a first matrix having a plurality of loops of difference measurements such as for example, the matrix of FIG. 2 previously described. In like manner, the second small shear interferometer having a relatively large dynamic range produces a second set of phase noisier difference measurements having values indicative of wavefront slopes, preferably arranged in a second matrix similar to the matrix previously described in connection with FIG. 2. The first set of measurements are very accurate but are ambiguous, since the atmospheric tilt may be as large as plus or minus two wavelengths per sub-aperture, and the dynamic range is only plus or minus one half wavelength per sub-aperture. On the other hand, the second set of noiser phase value measurements are less accurate due to increased noise effects since the shear of the second interferometer is only one fourth of a sub-aperture and due to three times less spatial resolution. However, in contrast with the first set, the second set of measurements produced by the second interferometer will have no ambiguity since its dynamic range is plus or minus two wavelengths per sub-aperture.

In accordance with the invention, the two sets of measurements are processed in order to obtain the superior accuracy of the first set of measurements, while obtaining the benefits of the larger dynamic range of the second set to resolve the ambiguity problem. Since the wavefronts are mainly composed of low spatial frequencies, the three times lower resolution does not significantly adversely affect the ability to determine the correct wavelength sub-aperture range either. The small shear, large dynamic range interferometer employed alone, would require considerably more light to obtain the same accuracy relative to the light intensity requirement of the large shear interferometer. The latter fact is quite important for light starved applications.

Since the second set of measurements are relatively inaccurate compared to the first set, a third set of phase difference measurements is preferably derived by spatially averaging each difference measurement of the second set over neighboring values. For example, the phase difference value 31 shown in FIG. 2 would not be utilized directly, but a new value of the phase difference measurement at 31 would be obtained by averaging 31 with eight adjacent or nearby phase difference values positioned about 31, namely 32, 33, 34, 36, 37, 39, 41 and 42; thus nine measurements are averaged. This process is repeated for each other phase difference value of the second data set in the matrix and its adjacent plurality of phase values to produce a third set of now averaged measurements.

Temporal averaging of the second interferometer measurements, rather than or in addition to the above stated spatial averaging, may be employed, whereby a plurality of incoming wavefronts, if available, produce a plurality of second sets of wavefront phase measurements. The resulting plurality of measurements associated with each wavefront portion are averaged over a given time period to produce a third set of averaged measurements for the entire wavefront examined.

The next step is in effect to compare each averaged phase difference measurement of the third set, with a group of virtual candidate measurements of each corresponding difference measurement of the first set, and determining for each such comparison which of the first set candidate measurements are closest to the corresponding measurement of the third set. For example, let it be assumed that a given measurement M of the first set is 0.28. Due to the limited dynamic range of the first interferometer, such a reading could be indicative of a real phase difference 0.28, or could also be indicative of a real phase difference of 1.28, minus 0.72, or minus 1.72 owing to the aforementioned ambiguity. These four measurements may be termed virtual candidate measurements. Now let it be assumed that the corresponding averaged measurement of the second small shear interferometer 5', is minus 0.71. This reading may be compared with the above mentioned four virtual candidate measurements and it may be seen that the measurement of minus 0.72 of the virtual candidate measurements produces the best match with the corresponding averaged measurement in the third set of data of the second shearing interferometer 5'. Thus the minus 0.72 reading represents the correct phase difference measurement, and is employed in the final wavefront shape determination. The minor share of the light under examination by the second low shear interferometer, is sufficient for the production of the third set of measurements since the weaker light is averaged over a substantial number of measurements, e.g. nine, where spatial averaging is employed. In other words averaging of each phase measurement of the second set over three by three sub-apertures results in obtaining the same number of photons per measurement as in the large shear interferometer.

A generalized algorithm for carrying out the aforesaid process for any set of dynamic ranges is as follows:

$$M' = M_1 + 2R_1 \text{ INT } [(M_2 - M_1)/2R_1]. \tag{1}$$

All measurements are normalized phase change per actuator spacing. $M'$ is the final output measurement while $M_1$ is the first measurement at a first matrix position of the first set of phase difference measurements. $M_2$ is the averaged phase difference measurement of the third set of measurements at the corresponding given matrix position. The algorithm assumes that $M_2$ does not exceed the dynamic range of $-R_2$ to plus $R_2$, but that $M_1$ might. $R_1$ is the dynamic range of the first shearing interferometer and $R_2$ is the dynamic range of the second shearing interferometer. INT is the "nearest integer" function.

For the first example given previously, let us again assume that $R_1$ is 0.5 wavelengths, $R_2$ is 2 wavelengths, $M_1$ is 0.28 and $M_2 = -0.71$. Thus:

$$M' = .28 + (2 \times .5) \, INT \frac{-.71 - .28}{2(.5)} = .72$$

In a second example, $M_1 = -0.35$, $M_2 = 0.48$ and substituting these parameters in algorithm one with the same ranges produces a result of $M' = 0.65$.

The algorithm is applied to the next pair of phase measurements of the first and third (averaged) data sets, and so on to cover all matrix positions. The resulting matrix of data may then be employed in accordance with the teachings of the aforesaid patents and publications for wavefront correction.

Algorithm One will also yield the proper result for dynamic ranges other than unity (plus or minus 0.5 wavelengths). For example, let the dynamic range of the first interferometer be $-0.7$ to $+0.7$ wavelengths ($R_1 = 0.7$) and let the range of the second interferometer be $-3.4$ wavelengths to $+3.4$ wavelengths ($R_2 = 3.4$). Assume $M_1$ to be 0.59 and $M_2$ to be 2.30; substitution of these parameters in algorithm One, produces a final measurement of 1.99.

The aforesaid data processing steps of averaging each phase measurement of the second set of measurements to produce the third set, and the application of algorithm One thereto, is of course within the skill of the ordinary worker in the art and the further implementation thereof will thus not be described in greater detail in the interest of clarity, brevity and economy. These steps may be performed utilizing hardware or software as desired.

I claim:

1. A method of measuring a given wavefront of light with a first shearing interferometer having a given shear and dynamic range, and with a second interferometer having a relatively small shear with respect to said given shear and having a relatively large dynamic range comprising the steps of:
   a. directing most of said light of said wavefront to said first interferometer and at least a portion of the remaining light of said wavefront to said second interferometer;

b. utilizing said first interferometer to produce a first set of phase difference measurements having values indicative of wavefront slopes, each measurement of said first set having a plurality of virtual candidate measurements due to measurement ambiguity produced by said large shear;

c. utilizing said second interferometer to produce a second set of phase difference measurements having values indicative of wavefront slopes;

d. comparing each difference measurement of said second set of measurements with said virtual candidate measurements of each corresponding difference measurement of said first set;

e. determining for each measurement of step d which of said candidate measurements are closest to the corresponding measurement of said second set; and f. utilizing the closest candidate measurements determined in accordance with step e to measure the shape of said wavefront.

2. The method of claim 1 wherein step e. is performed in accordance with the algorithm: $M' = M_1 + 2R_1 \text{INT}[(M_2 - M_1/2R_1]$ wherein $M'$ is the final output measurement while $M_1$ is the first measurement at a first matrix position of the first set of phase difference measurements; $M_2$ is the averaged phase difference measurement of the third set of measurements at the corresponding given matrix position; $R_1$ is the dynamic range of the first shearing interferometer; $R_2$ is the dynamic range of the second shearing interferometer and INT is the nearest integer function.

3. The method of claim 1 wherein over 80% of the light of said wavefront is directed at said first interferometer, and the remainder at said second interferometer.

4. The method of claim 2 wherein over 80% of the light of said wavefront is directed at said first interferometer, and the remainder at said second interferometer.

5. A method of measuring a given wavefront of light with a first shearing interferometer having a given shear and dynamic range, and with a second interferometer having a relatively small shear with respect to said given shear and having a relatively large dynamic range comprising the steps of:

a. directing most of said light of said wavefront to said first interferometer and at least a portion of the remaining light of said wavefront to said second interferometer;

b. utilizing said first interferometer to produce a first set of phase difference measurements having values indicative of wavefront slopes, each measurement of said first set having a plurality of virtual candidate measurements due to measurement ambiguity produced by said large shear;

c. utilizing said second interferometer to produce a second set of phase difference measurements having values indicative of wavefront slopes;

d. producing a third set of phase difference measurements by spatially averaging groups of neighboring difference measurements of said second set;

e. comparing each difference measurement of said third set of measurements with said virtual candidate measurements of each corresponding difference measurement of said first set;

f. determining for each measurement of step e which of said candidate measurements are closest to the corresponding measurement of said second set; and g. utilizing the closest candidate measurements determined in accordance with step f to measure the shape of said wavefront.

6. The method of claim 5 wherein step f is performed in accordance with the algorithm: $M' = M_1 + 2R_1 \text{INT}[(M_2 - M_1)/2R_1]$ wherein $M'$ is the final output measurement while $M_1$ is the first measurement at a first matrix position of the first set of phase difference measurements; $M_2$ is the averaged phase difference measurement of the third set of measurements at the corresponding given matrix position; $R_1$ is the dynamic range of the first shearing interferometer; $R_2$ is the dynamic range of the second shearing interferometer and INT is the nearest integer function.

7. The method of claim 5 wherein about 80% of the light of said wavefront is directed at said first interferometer, and the remainder at said second interferometer.

8. The method of claim 6 wherein over 80% of the light of said wavefront is directed at said first interferometer, and the remainder at said second interferometer.

9. A method of measuring a given wavefront of light with a first shearing interferometer having a given shear and dynamic range, and with a second interferometer having a relatively small shear with respect to said given shear and having a relatively large dynamic range comprising the steps of:

a. directing most of said light of said wavefront to said first interferometer and at least a portion of the remaining light of said wavefront to said second interferometer;

b. utilizing said first interferometer to produce a first set of phase difference measurements having values indicative of wavefront slopes, each measurement of said first set having a plurality of virtual candidate measurements due to measurement ambiguity produced by said large shear;

c. utilizing said second interferometer to sequentially produce a plurality of second sets of phase difference measurements having values indicative of wavefront slopes;

d. producing a third set of phase difference measurements by temporarily averaging the difference measurements of said second sets over a given time period;

e. comparing each difference measurement of said third set of measurements with said virtual candidate measurements of each corresponding difference measurement of said first set;

f. determining for each measurement of step e which of said candidate measurements are closest to the corresponding measurement of said third set; and g. utilizing the closest candidate measurements determined in accordance with step f. to measure the shape of said wavefront.

10. The method of claim 9 wherein step f is performed in accordance with the algorithm: $M' = M_1 + 2R_1 \text{INT}[(M_2 - M_1)/2R_1]$ wherein $M'$ is the final output measurement while $M_1$ is the first measurement at a first matrix position of the first set of phase difference measurements; $M_2$ is the averaged phase difference measurement of the third set of measurements at the corresponding given matrix position; $R_1$ is the dynamic range of the first shearing interferometer;

$R_2$ is the dynamic range of the second shearing interferometer and INT is the nearest integer function.

11. The method of claim 9 wherein over 80% of the light of said wavefront is directed at said first interferometer, and the remainder at said second interferometer.

12. The method of claim 10 wherein over 80% of the light of said wavefront is directed at said first interferometer, and the remainder at said second interferometer.

13. A method of measuring a given wavefront of light received at a measuring aperture having a plurality of sub-apertures with a first shearing interferometer having a given shear and dynamic range, and with a second interferometer having a relatively small shear with respect to said given shear and having a relatively large dynamic range comprising the steps of:
  a. directing most of said light of said wavefront to said first interferometer and at least a portion of the remaining light of said wavefront to said second interferometer;
  b. utilizing said first interferometer to produce a first set of phase difference measurements having values indicative of wavefront slopes, arranged in a first matrix having a plurality of loops of said difference measurements, each loop corresponding to a sub-aperture and each measurement of said first set having a plurality of virtual candidate measurements due to measurement ambiguity produced by said large shear;
  c. utilizing said second interferometer to sequentially produce a plurality of second sets of phase difference measurements having values indicative of wavefront slopes.
  d. producing a third set of phase difference measurements by temporally averaging the difference measurements of said second sets over a given time period and by spatially averaging groups of neighboring difference measurements within at least one set of said second sets;
  e. comparing each difference measurement of said third set of measurements with said virtual candidate measurements of each corresponding difference measurement of said first set;
  f. determining for each measurement of step e which of said candidate measurements are closest to the corresponding measurement of said second set; and
  g. utilizing the closest candidate measurements determined in accordance with step f. to measure the shape of said wavefront.

14. The method of claim 13 wherein step f. is performed in accordance with the algorithm: $M' = M_1 + 2R_1 \text{INT}[(M_2 - M_1)/2R_1]$ wherein $M'$ is the final output measurement while $M_1$ is the first measurement at a first matrix position of the first set of phase difference measurements; $M_2$ is the averaged phase difference measurement of the third set of measurements at the corresponding given matrix position; $R_1$ is the dynamic range of the first shearing interferometer; $R_2$ is the dynamic range of the second shearing interferometer and INT is the nearest integer function.

15. The method of claim 13 wherein over 80% of the light of said wavefront is directed at said first interferometer, and the remainder at said second interferometer.

16. The method of claim 14 wherein over 80% of the light of said wavefront is directed at said first interferometer, and the remainder at said second interferometer.

* * * * *